United States Patent
Greither

(10) Patent No.: US 9,466,969 B2
(45) Date of Patent: Oct. 11, 2016

(54) MASTER-SLAVE DIGITAL CIRCUIT BREAKERS

(71) Applicant: Hamilton Sundstrand Corporation, Windsor Locks, CT (US)

(72) Inventor: Markus Greither, Augsburg (DE)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 402 days.

(21) Appl. No.: 14/223,781

(22) Filed: Mar. 24, 2014

(65) Prior Publication Data

US 2014/0285940 A1    Sep. 25, 2014

(30) Foreign Application Priority Data

Mar. 25, 2013  (DE) .......................... 10 2013 030 20

(51) Int. Cl.
*H01H 73/00* (2006.01)
*H02H 3/087* (2006.01)
*H02H 3/033* (2006.01)

(52) U.S. Cl.
CPC .............. *H02H 3/087* (2013.01); *H02H 3/033* (2013.01)

(58) Field of Classification Search
CPC ...... H01H 71/123; H01H 83/20; H01H 9/54; H02H 3/335
USPC ........................................................ 361/115
See application file for complete search history.

(56) References Cited

U.S. PATENT DOCUMENTS

| | | | | |
|---|---|---|---|---|
| 4,972,290 A | * | 11/1990 | Sun .................. | H02H 7/261 361/64 |
| 5,543,995 A | * | 8/1996 | Kumagai ............ | G01R 31/085 324/522 |
| 2003/0189804 A1 | * | 10/2003 | Kampmeyer .......... | H02H 3/33 361/42 |
| 2009/0040673 A1 | * | 2/2009 | Maigret ............... | H01H 89/06 361/63 |

FOREIGN PATENT DOCUMENTS

GB           2438712 A         12/2007

OTHER PUBLICATIONS

Communication pursuant to Article 94(3) EPC dated Dec. 3, 2015, for corresponding European Patent Application No. 14161032.9.
Ivan Bernard Fuller: "Schemes for Redundancy by Information Exchange Between Relays in Power System", ip.com Journal, Jun. 29, 2012.
European Search Report for EP14161032.9 dated Jun. 12, 2014.

* cited by examiner

*Primary Examiner* — Dharti Patel
(74) *Attorney, Agent, or Firm* — Kinney & Lange, P.A.

(57) ABSTRACT

An electrical system includes a first circuit breaker that digitally senses a first current to a first load, and a second circuit breaker that digitally senses a second current to a second load and provides an output to the first circuit breaker. The first circuit breaker determines an average current based upon the first sensed current and the output from the second circuit breaker, and the first and second circuit breakers terminate power to the first and second loads if the average current is greater than a threshold value.

19 Claims, 4 Drawing Sheets

MASTER-SLAVE DIGITAL CIRCUIT BREAKERS

CROSS-REFERENCE TO RELATED APPLICATION

This application claims priority to foreign patent application DE 102013103020.3, filed Mar. 25, 2013, which is hereby incorporated by reference in its entirety.

BACKGROUND

Circuit breakers are used to protect electrical systems in case of overcurrent conditions which can be caused by, for example, short circuits or broken loads. Traditionally, circuit breakers were mechanical switches that would open upon detection of an overcurrent condition. Recently, in place of the traditional mechanical switches, electronic devices such as metal-oxide-semiconductor field-effect transistor (MOSFET) power switches have been implemented.

Multiple circuit breakers are often implemented to accommodate multiple loads. They can either be used as stand-alone circuit breakers, or in parallel to form a higher tolerance breaker. If used in parallel, the circuit breakers must share current between one another. Ideally, for example, two five amp circuit breakers would combine to form a ten amp circuit breaker when connected in parallel. In practice, however, unequal current sharing due to internal tolerancing often results in one breaker that draws more current than the other, and thus trips earlier. This leads to the parallel circuit breakers providing a higher than desired tolerance.

SUMMARY

An electrical system includes first and second circuit breakers. The first circuit breaker digitally senses a current to a first load, and the second circuit breaker digitally senses a current to a second load. The second circuit breaker provides an output to the first circuit breaker. The first circuit breaker determines an average current based upon the first sensed current and the output from the second circuit breaker, and the first and second circuit breakers terminate power to the loads if the average current is greater than a threshold value.

DETAILED DESCRIPTION

The present invention is related to electric systems, and in particular to parallel electronic circuit breakers. Two or more electronic circuit breakers may be used stand-alone or in parallel. Each circuit breaker includes current sensing through the use of a shunt resistor. The sensed current in the form of a voltage across the shunt resistor is amplified and converted into a digital bit-stream using a sigma-delta converter. Each circuit breaker includes a bit stream averager, and the breaker that is designated as the master uses its bit stream averager to average its own sensed current bit stream with the sensed current bit stream of the slave circuit breaker. A processor of the master circuit breaker determines if the average bit stream represents an average current to the loads that is greater than a threshold value. If so, the master circuit breaker terminates power to its load, and provides an indication to the slave circuit breaker to do the same. Any number of circuit breakers can be connected in this way. If connecting more than two circuit breakers in parallel, the bit stream of each slave is averaged to the bit stream of the previous slave.

Figure 1:
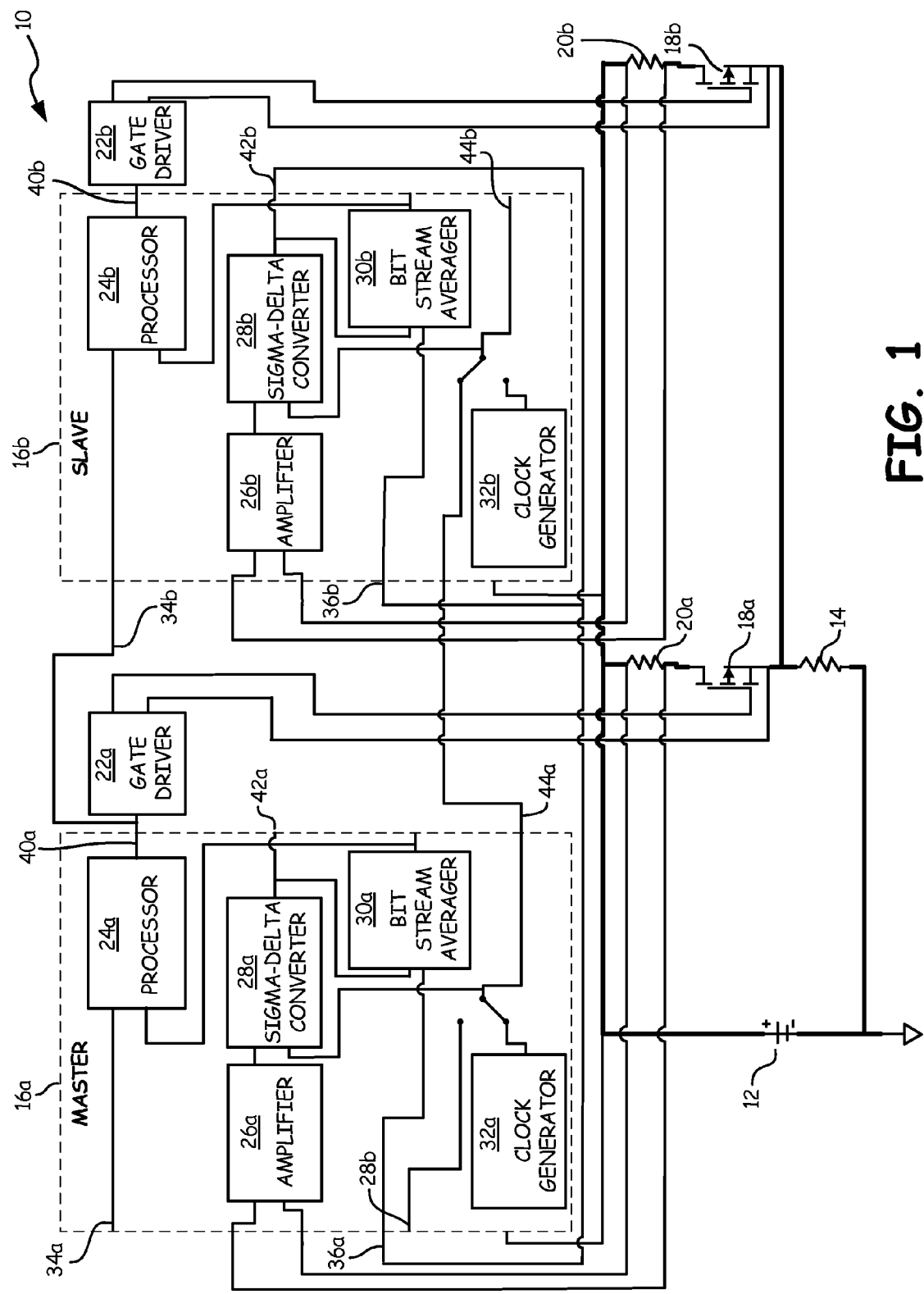
FIG. 1 is a circuit diagram illustrating an electrical system that includes master-slave paralleled circuit breakers.

FIG. 1 is a circuit diagram illustrating electrical system 10 that includes master-slave paralleled circuit breakers. System 10 includes power source 12, load 14, circuit breakers 16a and 16b, power switches 18a and 18b, shunt resistors 20a and 20b, and gate drivers 22a and 22b. Circuit breaker 16a includes processor 24a, amplifier 26a, analog-digital converter 28a, digital averager 30a, clock generator 32a, inputs 34a, 36a, and 38a, and outputs 40a, 42a, and 44a. Circuit breaker 16b includes processor 24b, amplifier 26b, analog-digital converter 28b, digital averager 30b, clock generator 32b, inputs 34b, 36b, and 38b, and outputs 40b, 42b, and 44b. Power source 12 is any known AC or DC power source. Power source 12 provides power to load 14 through power switches 18a and 18b. Circuit breakers 16a and 16b control power switches 18a and 18b, respectively.

In the present embodiment, circuit breaker 16a is configured as the master circuit breaker, and circuit breaker 16b is configured as the slave circuit breaker. In other embodiments, circuit breakers 16a and 16b could act as stand-alone circuit breakers, or circuit breaker 16b could be configured as the master circuit breaker with circuit breaker 16a as the slave.

Circuit breakers 16a and 16b sense current to load 14 in the form of voltages across shunt resistors 20a and 20b. Circuit breaker 16a receives the voltage across shunt resistor 20a and amplifies it using amplifier 26a. Analog-to-digital converter 28a converts the amplified voltage from amplifier 26a into, for example, a digital bit stream. The bit stream is provided to bit stream averager 30a. Amplifier 26a is any known electronic amplifier, and analog-to-digital converter 28a is any known analog-to-digital converter such as, for example, a sigma-delta converter. A sigma-delta converter uses error feedback to generate a bit stream with a given time period. This bit stream is representative of the analog input.

Circuit breaker 16b receives the voltage across shunt resistor 20b and amplifies it using amplifier 26b. Analog-to-digital converter 28b converts the amplified voltage from amplifier 26b into a digital bit stream. Amplifier 26b is any known electronic amplifier, and analog-to-digital converter 28b is any known analog-to-digital converter such as, for example, a sigma-delta converter. Because circuit breaker 16b is the slave circuit breaker, the bit stream from analog-to-digital converter 28b is provided on output 42b to bit stream averager 30a on input 36a of circuit breaker 16a. For synchronization purposes, each circuit breaker utilizes the same clock. For example, the output of clock generator 32a may be provided on output 44a to input 38b of circuit breaker 16b. Analog-to-digital converter 28b may then, for example, run off the clock from circuit breaker 16a.

Digital averager 30a averages the digital values provided by analog-to-digital converters 28a and 28b. In the present embodiment, digital averager 30a performs bit stream averaging with carry to provide a bit stream average. Bit stream averaging with carry is performed on each bit of the two bit streams. Each bit of the bit stream from analog-to-digital converter 28a is averaged with each bit of the bit stream from analog-to-digital converter 28b for the given period of the bit streams. The result is an average bit stream with the same period as the input bit streams.

The average bit stream is provided to processor 24a. Processor 24a knows the period of the bit stream and can therefore determine the average current sensed between the two circuit breakers based upon the average bit stream. Processor 24a then determines if the average sensed current is greater than a threshold value. The threshold value is set to any value that corresponds to a desired greatest amount of allowable total current to load 14.

If the average current sensed is greater than the threshold value, processor 24a provides a terminate signal on output 40a to both gate driver 22a and input 34b of slave circuit breaker 16b. Processor 24b receives the terminate signal from input 34b and provides a terminate signal on output 40b to gate driver 22b. Gate drivers 22a and 22b open switches 18a and 18b, respectively, upon receiving the terminate signals. Switches 18a-18b are any electronic switches such as, for example, metal-oxide-semiconductor field-effect transistor (MOSFET) power switches. Switches 18a and 18b may be closed to once again provide power to load 14 following, for example, a given time period, user input, certain observed conditions, or any other desired event.

Figure 2:
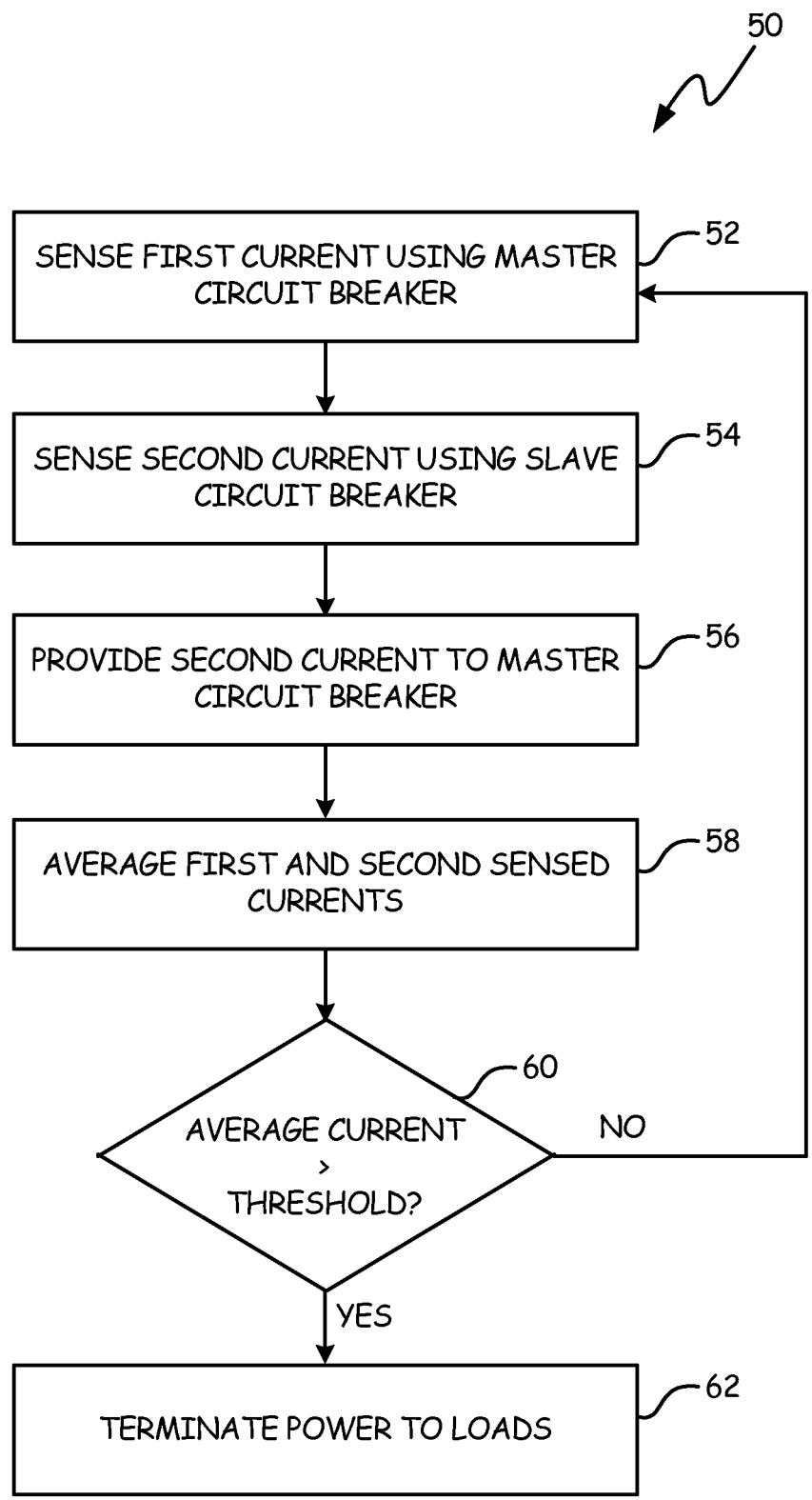
FIG. 2 is a flowchart illustrating a method for digitally summing currents for an electrical system that includes master-slave paralleled circuit breakers.

FIG. 2 is a flowchart illustrating method 50 for digitally summing currents for an electrical system that includes master-slave paralleled circuit breakers. At step 52, master circuit breaker 16a senses a current through shunt resistor 20a. Master circuit breaker 16a amplifies the signal and converts the signal to a digital signal using analog-digital converter 28a. At step 54, slave circuit breaker 16b senses a current through shunt resistor 20b. Slave circuit breaker 16b amplifies the signal and converts the signal to a digital signal using analog-digital converter 28b. At step 56, slave circuit breaker 16b provides its digital signal to master circuit breaker 16a. At step 58, master circuit breaker 16a averages the digital signal from slave circuit breaker 16b with its own digital signal using digital averager 30a. At step 60, processor 24a determines if the averaged value is greater than a threshold value. If it is, method 50 proceeds to step 62. If it is not, method 50 returns to step 52. At step 62, processor 24a provides a signal to terminate power to load 14. Switches 18a and 18b are opened which terminates power to load 14.

Figure 3:
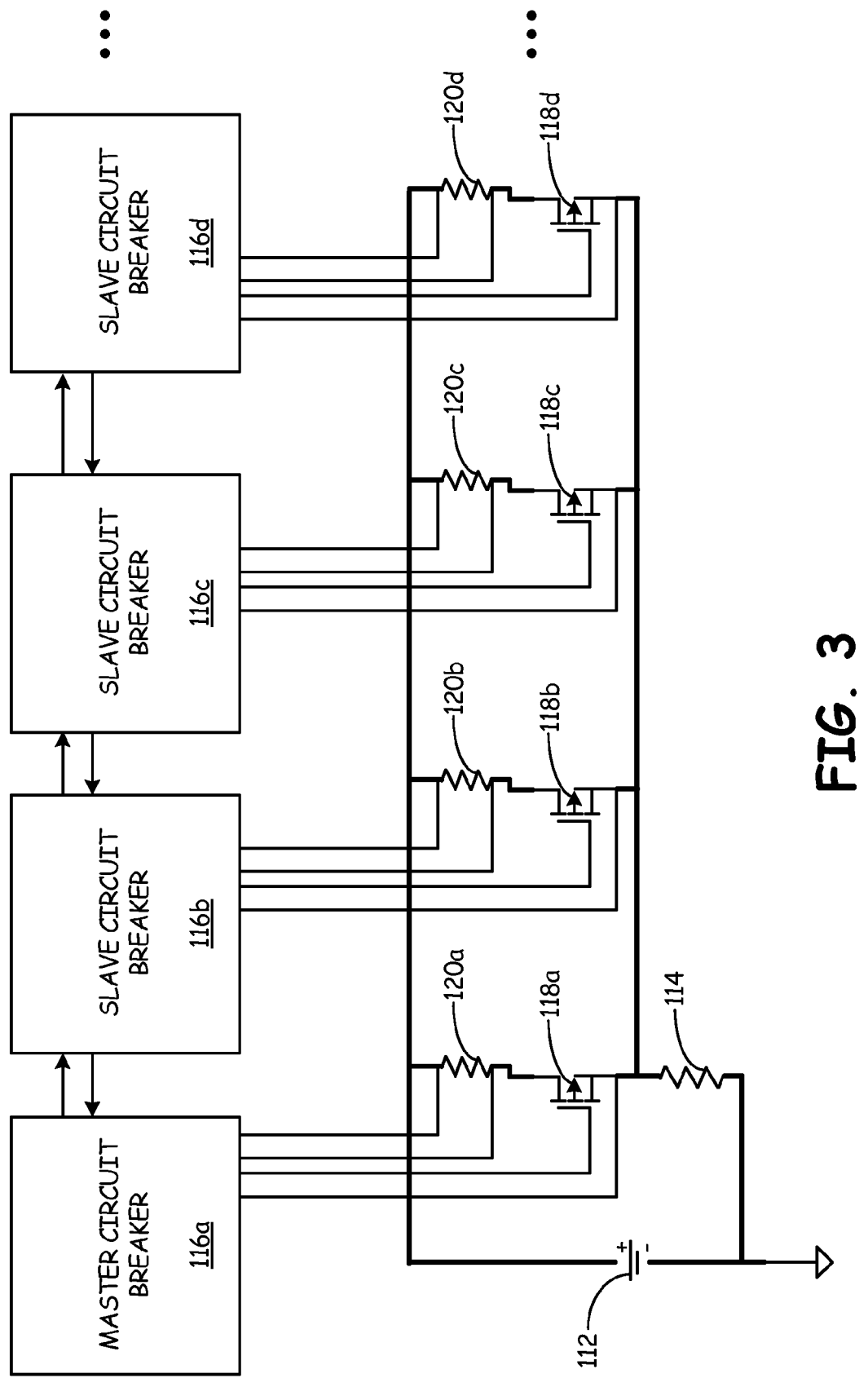
FIG. 3 is a block diagram illustrating a plurality of circuit breakers in a master-slave configuration.

FIG. 3 is a block diagram illustrating electrical system 110 that includes a plurality of circuit breakers in a master-slave configuration. System 110 includes power source 112, load 114, circuit breakers 116a-116d, power switches 118a-118d, and shunt resistors 120a-120d. Circuit breaker 116a is configured as the master circuit breaker and circuit breakers 116b-116d are configured as slaves. Each circuit breaker 116a-116d senses the current through respective shunt resistors 120a-120d. Slave circuit breaker 116c receives a digital current value from slave circuit breaker 116d and performs a bitwise average on the value from circuit breaker 116d and its own digital current value. Slave circuit breaker 116b performs a bitwise average on its own digital current value and the average value from circuit breaker 116c. Master circuit breaker 116a performs a bitwise average on its own digital current value and the bitwise average value from circuit breaker 116b. While illustrated as four circuit breakers, any number of circuit breakers can be implemented in system 110.

Bit stream averaging by slave circuit breakers 116b-116d and by master circuit breaker 116a may be performed using the following equations:

$$\langle average \rangle = 1:(\langle ser\_count \rangle * \langle ser\_val \rangle) + \langle i\_val \rangle + \langle carry \rangle > \langle ser\_count \rangle$$
$$= 0:(\langle ser\_count \rangle * \langle ser\_val \rangle) + \langle i\_val \rangle + \langle carry \rangle <= \langle ser\_count \rangle$$

$$\langle carry \rangle = (\langle ser\_count \rangle * \langle ser\_val \rangle + \langle i\_val \rangle + \langle carry \rangle) - (\langle average \rangle * (\langle ser\_count \rangle + 1))$$

Where:
<average>: Average bit stream value determined by the present circuit breaker;
<carry>: Memorized rounding error to be considered during the next average bit stream value calculation;
<ser_count>: Number of bit stream values already averaged by previous circuit breakers for the present input average data stream;
<ser_val>: Present bit of the serial input data stream;
<i_val>: Sensed current bit measured by the present circuit breaker.

The <average> equation determines a bit value to be sent to the next circuit breaker if being calculated by one of slave circuit breakers 116b-116d, or the final average value if being calculated by master circuit breaker 116a. The received bit value <ser_val> from the previous slave circuit breaker is multiplied with the number of slave circuit breaker values already averaged in this bit stream (<ser_count>). For example, if circuit breaker 116a is performing the average, <ser_count> would be three because the bit stream value <ser_val> received is the average of slaves 116b, 116c and 116d. The number of slave circuit breaker values already averaged is determined and sent by software to the present circuit breaker. The value of current sensed by this circuit breaker, <i_val>, is added to <ser_count> along with the present value of <carry>. If the resulting value is equal or larger than <ser_count>, the reported average bit value is 1. If not, the reported average bit value is 0.

The <carry> equation now uses the result of the <average> equation and stores the difference between the summed present value and the number of previous circuit breakers that have contributed to the average bit stream. The <carry> value is used to ensure there is not a significant rounding error, which would reduce the accuracy of the value reported.

Figure 4:
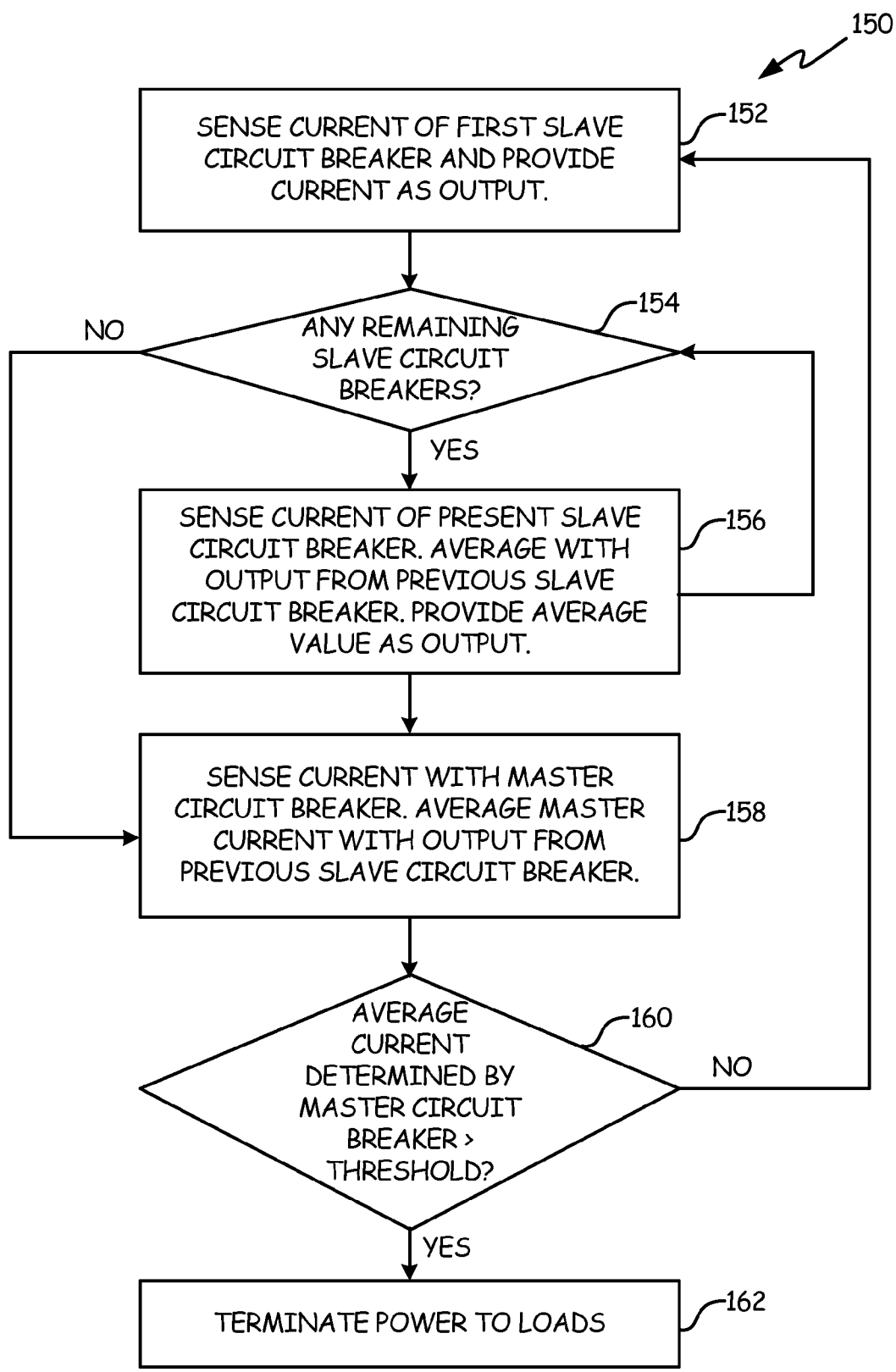
FIG. 4 is a flowchart illustrating a method for digitally summing currents for an electrical system that includes master-slave paralleled circuit breakers with multiple slave circuit breakers.

FIG. 4 is a flowchart illustrating method 150 for digitally summing currents for an electrical system that includes master-slave paralleled circuit breakers with multiple slave circuit breakers. At step 152, a first slave circuit breaker, such as circuit breaker 116d of FIG. 3, senses a current and provides the current as an output. At step 154, it is determined if any slave circuit breakers remain. If any slave circuit breakers remain, method 150 proceeds to step 156. If no slave circuit breakers remain, method 150 proceeds to step 158. At step 156, the present slave circuit breaker senses its corresponding current, and averages its sensed current with the output of the previous slave circuit breaker. The present slave circuit breaker provides the average current as an output. Method 150 returns to step 154 following step 156. At step 158, master circuit breaker 116a senses its corresponding current, and averages its sensed current with the output of the previous slave circuit breaker. At step 160, if the average current determined by master circuit breaker 116a is greater than a threshold value, method 150 proceeds to step 162. If the average current is not greater than a threshold value, method 150 returns to step 152. At step 162, power to load 114 is terminated by circuit breakers 116a-116d.

The following are non-exclusive descriptions of possible embodiments of the present invention.

An electrical system includes, among other things: a first circuit breaker that digitally senses a first current to a first load, and a second circuit breaker that digitally senses a second current to a second load and provides an output to the first circuit breaker. The first circuit breaker digitally determines an average current based upon the first sensed current and the output of the second circuit breaker. The first and second circuit breakers terminate power to the first and second loads if the average current is greater than a threshold value.

The electrical system of the preceding paragraph can optionally include, additionally and/or alternatively, any one or more of the following features, configurations and/or additional components:

The first and second circuit breakers each include an analog-to-digital converter, a digital averager, and a processor.

The analog-to-digital converter is a sigma-delta converter that converts an analog voltage into a digital bit stream.

The digital averager of the first circuit breaker receives a first bit stream from the sigma-delta converter of the first circuit breaker, and a second bit stream from the second circuit breaker. The digital averager of the first circuit breaker outputs an average bit stream based upon the first and second bit streams.

The average bit stream from the digital averager of the first circuit breaker is provided to the processor of the first circuit breaker. The processor of the first circuit breaker determines if the average bit stream represents an average current greater than the threshold value.

If the average current is greater than the threshold value, the processor of the first circuit breaker terminates power to the first load and provides an indication to the processor of the second circuit breaker to terminate power to the second load.

The first and second circuit breakers further include a clock generator. An output of the clock generator of the first circuit breaker is provided to the second circuit breaker for synchronization.

A third circuit breaker that digitally senses a third current to a third load and provides an output to the second circuit breaker. The output of the second circuit breaker is an average of the second sensed current and the output of the third circuit breaker.

A method includes, among other things: sensing a first current using a first circuit breaker, sensing a second current using a second circuit breaker, providing an output from the second circuit breaker to the first circuit breaker, averaging the first sensed current and the output from the second circuit breaker to determine a digital average current, and terminating power to first and second loads if the digital average current is greater than a threshold value.

Sensing a first current includes amplifying a first voltage across a first shunt resistor and converting the first voltage into a first digital signal.

Sensing a second current includes amplifying a second voltage across a second shunt resistor and converting the second voltage into a second digital signal.

Averaging the first sensed current and the output from the second circuit breaker includes averaging the first digital signal and the second digital signal using a bit stream averager of the first circuit breaker.

Terminating power to first and second loads includes a processor of the first circuit breaker sending a terminate signal to both a gate driver of a first power switch, and the second circuit breaker.

Terminating power to the first and second loads further includes a processor of the second circuit breaker sending a terminate signal to a gate driver of a second power switch based upon the terminate signal from the processor of the first circuit breaker.

A master circuit breaker includes, among other things: an analog-to-digital converter that converts an analog voltage into a first digital voltage, an input that receives a second digital voltage from a slave circuit breaker, a bit-stream averager that determines an average voltage from the first digital voltage and the second digital voltage, and an output control signal that indicates when the average voltage is greater than a threshold value.

The master circuit breaker of the preceding paragraph can optionally include, additionally and/or alternatively, any one or more of the following features, configurations and/or additional components:

A processor that determines if the average voltage is greater than the threshold value.

The output control signal is provided to the slave circuit breaker and a gate driver of a first power switch.

A clock generator that generates an output that is provided to the analog-to-digital converter and the slave circuit breaker.

An amplifier that amplifies the analog voltage for the analog-to-digital converter.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An electrical system comprising:
 a first circuit breaker that digitally senses a first current to a first load;
 a second circuit breaker that digitally senses a second current to a second load and provides an output to the first circuit breaker;
 wherein the first circuit breaker digitally determines an average current based upon the first sensed current and the output of the second circuit breaker; and
 wherein the first and second circuit breakers terminate power to the first and second loads if the average current is greater than a threshold value.

2. The system of claim 1, wherein the first and second circuit breakers each comprise:
 an analog-to-digital converter;
 a digital averager; and
 a processor.

3. The system of claim 2, wherein the analog-to-digital converter is a sigma-delta converter that converts an analog voltage into a digital bit stream.

4. The system of claim 3, wherein the digital averager of the first circuit breaker receives a first bit stream from the sigma-delta converter of the first circuit breaker, and a second bit stream from the second circuit breaker, and wherein the digital averager of the first circuit breaker outputs an average bit stream based upon the first and second bit streams.

5. The system of claim 4, wherein the average bit stream from the digital averager of the first circuit breaker is provided to the processor of the first circuit breaker, wherein the processor of the first circuit breaker determines if the average bit stream represents an average current greater than the threshold value.

6. The system of claim 5, wherein if the average current is greater than the threshold value, the processor of the first circuit breaker terminates power to the first load and provides an indication to the processor of the second circuit breaker to terminate power to the second load.

7. The system of claim 2, wherein the first and second circuit breakers further comprise a clock generator, and wherein an output of the clock generator of the first circuit breaker is provided to the second circuit breaker for synchronization.

8. The system of claim 1, further comprising:
a third circuit breaker that digitally senses a third current to a third load and provides an output to the second circuit breaker; and
wherein the output of the second circuit breaker is an average of the second sensed current and the output of the third circuit breaker.

9. A method comprising:
sensing a first current using a first circuit breaker;
sensing a second current using a second circuit breaker;
providing an output from the second circuit breaker to the first circuit breaker;
averaging the first sensed current and the output from the second circuit breaker to determine a digital average current; and
terminating power to first and second loads if the digital average current is greater than a threshold value.

10. The method of claim 9, wherein sensing a first current comprises amplifying a first voltage across a first shunt resistor and converting the first voltage into a first digital signal.

11. The method of claim 10, wherein sensing a second current comprises amplifying a second voltage across a second shunt resistor and converting the second voltage into a second digital signal.

12. The method of claim 11, wherein averaging the first sensed current and the output from the second circuit breaker comprises averaging the first digital signal and the second digital signal using a bit stream averager of the first circuit breaker.

13. The method of claim 12, wherein terminating power to first and second loads comprises a processor of the first circuit breaker sending a terminate signal to both a gate driver of a first power switch, and the second circuit breaker.

14. The method of claim 13, wherein terminating power to the first and second loads further comprises a processor of the second circuit breaker sending a terminate signal to a gate driver of a second power switch based upon the terminate signal from the processor of the first circuit breaker.

15. A master circuit breaker comprising:
an analog-to-digital converter that converts an analog voltage into a first digital voltage;
an input that receives a second digital voltage from a slave circuit breaker;
a bit-stream averager that determines an average voltage from the first digital voltage and the second digital voltage; and
an output control signal that indicates when the average voltage is greater than a threshold value.

16. The circuit breaker of claim 15, further comprising a processor that determines if the average voltage is greater than the threshold value.

17. The circuit breaker of claim 15, wherein the output control signal is provided to the slave circuit breaker and a gate driver of a first power switch.

18. The circuit breaker of claim 17, further comprising a clock generator that generates an output that is provided to the analog-to-digital converter and the slave circuit breaker.

19. The circuit breaker of claim 15, further comprising an amplifier that amplifies the analog voltage for the analog-to-digital converter.

* * * * *